United States Patent Office 2,935,637
Patented May 3, 1960

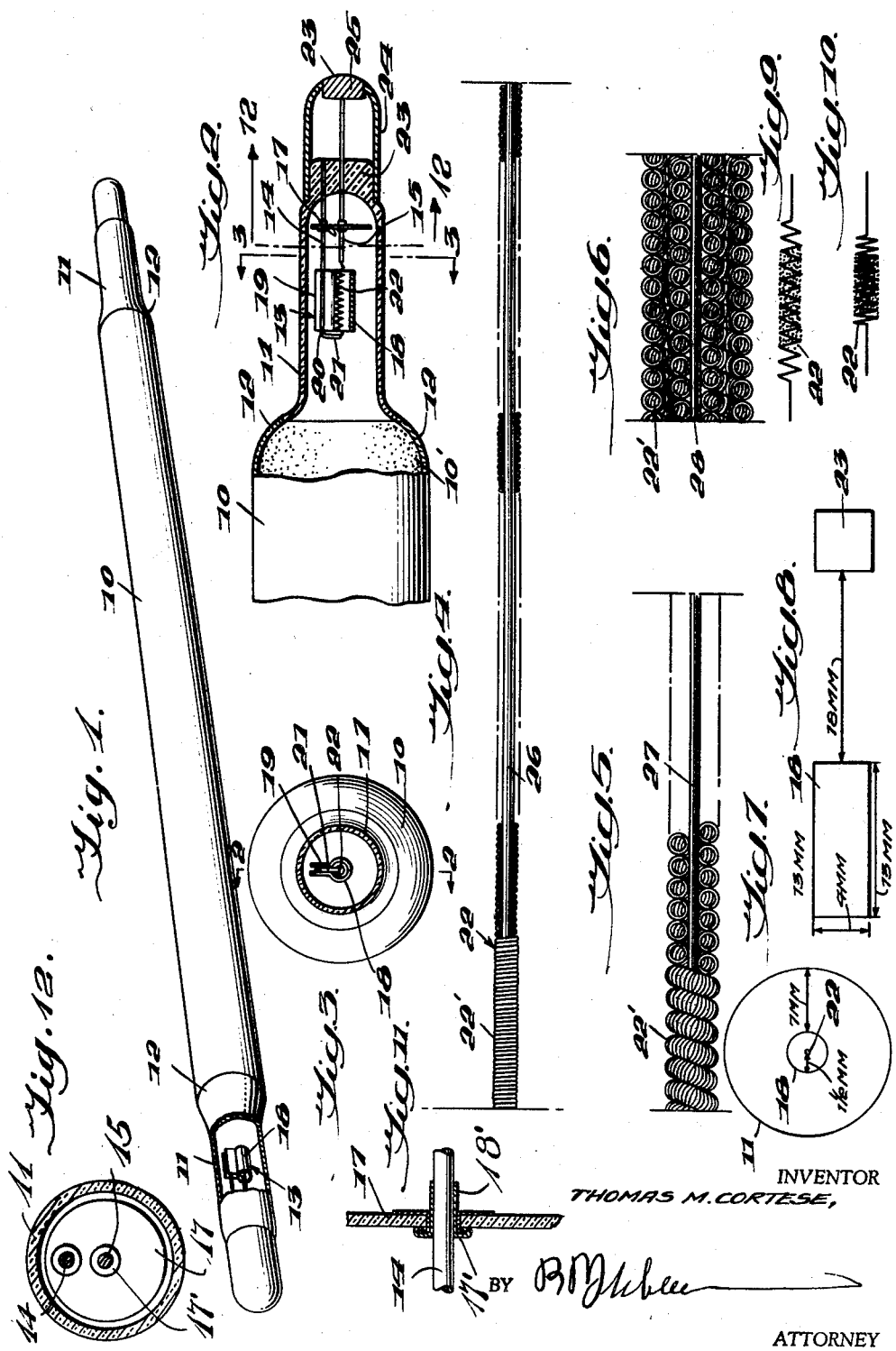

2,935,637

FLUORESCENT LAMP

Thomas M. Cortese, Elizabeth, N.J.

Application March 5, 1957, Serial No. 643,997

2 Claims. (Cl. 313—220)

My invention relates to low pressure discharge lamps of the positive column type, such as fluorescent lamps.

An important object of the invention is to provide a lamp of the above-mentioned character having less discoloration in use, and having a restricted envelope or tube part containing the electrode and electrode shield, whereby such restricted part serves as a collector of impurities and also functions as a cooling chamber to condense mercury, thereby controlling the mercury vapor pressure of the lamp.

A further object of the invention is to provide an electrode having the maximum number of cells therein for holding the electron emission coating.

A further object of the invention is to provide an electrode which is longitudinally distended when the plastic emission coating is applied to the electrode, which increases the size of the cells of the electrode so that the plastic emission coating may be properly applied to the intermediate portion of the electrode and will not creep to the ends of the electrode when such electrode again contracts.

A further object of the invention is to extend the electrode supporting element slightly beyond the electrode shield, so that the extended end of the supporting element will then serve as an anode while the electrode will serve as a cathode, thereby taking part of the current load from the cathode and increasing the life of the lamp.

A further object of the invention is to disconnect the element which supports the electrode shield from the source of current, while connecting the electrode with the source of current, thereby prolonging the life of the lamp and causing the electrode shield to be more effective as a collector.

A further object of the invention is to arrange the electrode and electrode shield within the reduced envelope or tube extension at each end of the main envelope or tube and to arrange such electrode and shield axially of the main envelope or tube to increase the efficiency of the lamp.

Other objects and advantages of the invention will be apparent during the course of the following description.

In the accompanying drawings forming a part of this application and in which like numerals are employed to designate like parts throughout the same, Figure 1 is a perspective view of a fluorescent lamp embodying my invention, Figure 2 is a central vertical longitudinal section through the right end of the lamp, Figure 1, taken on line 2—2 of Figure 3, Figure 3 is a transverse section taken on line 3—3 of Figure 2, Figure 4 is a side elevation of the electrode filament indicating the first winding step, Figure 5 is a similar view indicating the second winding step, Figure 6 is a similar view indicating the third winding step, Figure 7 is a transverse section, shown diagrammatically, indicating the arrangement of the electrode shield and dimensions, Figure 8 is a diagrammatic side elevation of the electrode sleeve and squeeze and showing dimensions, Figure 9 is a side elevation of the spiral filament distended with the wet emission coating applied to the intermediate portion, Figure 10 is a similar view of the electrode after it has contracted, Figure 11 is an enlarged radial section through a mica shield and associated elements, Figure 12 is a side elevation of the mica shield taken on line 12—12 of Figure 2.

In the drawings, where for the purpose of illustration is shown a preferred embodiment of my invention, the numeral 10 designates a light transmitting envelope or tube, formed of vitreous material, such as glass, and having its inner surface coated with a fluorescent material 10', such as a phosphor coating. The envelope or tube 10 has a low pressure gas filling of from 1.5 to 7 mm. of inert gas, such as argon, or a mixture of inert gases, combined with a small quantity of mercury.

Disposed at the opposite ends of the main envelope or tube 10 and extending axially thereof are reduced envelopes or tubes 11, formed of vitreous material, such as glass. These reduced envelopes or tubes 11 may be formed integral with the main envelope or tube 10 or may be formed separate therefrom and welded to the ends 12 of the envelope or tube forming a gas tight joint therewith.

Arranged within each envelope or tube 11 is an electrode mount designated as a whole by the numeral 13. This electrode mount comprises wires 14 and 15, which are preferably formed of nickel, and the wire 15 may be connected with the terminal, to be described. The wires 14 and 15 are connected with an insulating element. This insulating element is in the form of a circular mica shield 17, arranged within the envelope 11, and having an external diameter slightly smaller than the internal diameter of the envelope 11. The mica shield 17 has openings formed therein to receive eyelets 17', suitably rigidly mounted thereon, and these eyelets include metal tubes 18', which receive the wires 14 and 15, and are welded to the wires. The mica shield is arranged at right angles to the longitudinal axis of the envelope 11. The mica shield 17 acts as a means of trapping the mercury and consequently controlling the vapor pressure of the mercury. The wires 14 and 15 are parallel, and they are rigidly connected by the shield 17, and each wire therefore has its stiffness greatly increased against lateral bending.

Arranged within the reduced envelope or tube 11 is a cylindrical shield 18, which may be formed of nickel or any other suitable metal, or of other material such as mica. This cylindrical shield is concentric with the envelope or tube 11, and is spaced from the envelope or tube for 7 mm. from the inner surface of the envelope 11. The shield 18 is cylindrical, as stated, and its opposite ends are open. The shield 18 is formed by bending a sheet upon itself to provide the cylindrical shield 18 and radial extensions 19. These extensions 19 are spaced and receive the wire between them and the extensions are welded to the wire. The wire 14 extends inwardly beyond the shield 18, as shown at 20, and is then bent into an arm 21, extending radially of the reduced envelope or tube 11.

Arranged within the metallic shield 18 is an electrode 22, which is concentric with the shield 18 and is spaced therefrom. The electrode 22 is preferably spaced 1½ mm. from the metallic shield 18. The inner end of the electrode 22 is connected with the radial extension 21 and its outer end is connected with the wire 15. The radial extension 21 serves as an anode and the electrode 22 serves as a cathode. The metallic tubular shield 18 has its outer end spaced for 18 mm. from the glass press 23, as shown. The wires 14 and 15 are spaced and parallel and are rigidly connected by the disc or shield 17, as stated. The stiffened wire 15 supports the electrode 22, while the stiffened wire 14 supports the tubular shield 18. The wire 14 extends between the flanges 19 and extends longitudinally of the flanges throughout their entire length and reinforces and stiffens the flanges. The radial extension 21 is secured to the forward end of the electrode 22, and the extension 21 serves as a cathode. It is thus seen that the wires 14 and 15, by being connected and stiffening each other, securely hold the electrode 22 and tubular shield 18 against displacement.

Mounted upon the press 23 is a metallic sleeve 24, which may be cemented thereon or secured thereto by any suitable means and this sleeve carries a contact or terminal 25, connected with the wire 15. The wires 14 and 15 are embedded in the press 23. The terminals 25 engage terminals in the sockets of the conventional fixture.

Particular attention is called to the fact that the metallic shield 18 and the electrode 22 are mounted within the reduced envelope or tube 11, and are spaced from the ends of this envelope, and extend axially of the main envelope 10 and reduced envelope 11.

An important feature of the invention is the formation of the spirally wound electrode 22, which is preferably formed of tungsten. This electrode is formed from a strand of tungsten wire which is wound in three separate successive spiral windings. In Figure 4, the tungsten wire 22' included in the electrode 22 is first spirally wound upon a cylindrical rod 26 into a spiral formation and is set in this spiral form. This spirally wound strand of wire 22' is removed from the rod 26 and spirally wound upon a second rod 27 and is set in the second spirally wound form. The wire 22', after the second winding, is removed from the rod 27 after it is set in the second spirally wound form and is then spirally wound upon a third rod 28. All of the rods are cylindrical. The wire 22', after the third spiral winding, is set and is removed from the rod 28. The completed spirally wound electrode has three separate spiral windings. This provides the completed electrode with a honeycomb formation, resulting in four to five thousand small retaining cells. These retaining cells are adapted to receive and hold the vital electron emission coating. This emission coating may be a mixture of strontium, barium, calcium and zirconium. This mixture is combined with a binding lacquer and this lacquer consists of a small percentage of nitro-cellulose dissolved in butyl acetate to produce a binder of suitable viscosity. When this binder is mixed with the strontium, barium, calcium and zirconium, the resultant mass which constitutes the emission coating, has a proper plasticity and viscosity. When the mass is allowed to set, the binder will harden.

Prior to coating the spirally wound electrode 22 with the electron emission coating, in the plastic state, the electrode is longitudinally stretched or distended, and the vital then plastic electron emission coating 29 is applied to the longitudinal central portion of the electrode 22, and is spaced from the ends of the electrode, Figure 9. This plastic coating will readily pass into the retention cells. After this coating action and before the electron emission coating 29 has hardened or set, the distended electrode is released, and it will contract to the normal length, Figure 10, and the coating will be distributed to the retaining cells in the central longitudinal portion of the electrode and the coating will not pass into the cells at the ends of the electrode and hence such ends are not coated. If the ends of the electrode should be coated, it would be difficult to degassify and this would cause yellow bands or other discolorations in the lamp. After the electrode has contracted, Figure 10, the coating sets or hardens and is secured to the electrode.

There are certain advantages which result from the construction and arrangement of the several parts of the lamp. The metallic shield 18 is preferably 13 mm. long and 4 mm. in diameter, Figure 8, and the electrode 22 is radially spaced from the shield 18 for 1½ mm., Figure 7, and this shield completely covers the electrode, except at its extreme ends. The electrode 22 is mounted axially with relation to the envelope or tube 10 and the dimensions referred to are important as they make the metallic shield 18 serve as a collector of impurities, within the reduced envelope 11, thereby preventing these impurities from condensing in the envelope or tube 10, causing appearance defects. I have found that by mounting the electrode 22 within the reduced envelope 11 that discoloration of the lamp is materially reduced. Another important feature is that the reduced envelope or tube 11 at each end of the envelope 10 is of smaller diameter than the envelope 10 and should have a diameter of one-half to one-third of the diameter of the envelope or tube 10. This reduced envelope or tube at each end of the envelope 10, which reduced envelope contains the electrode and metallic shield, serves as an additional collector of impurities and functions more importantly as a cooling chamber to condense the mercury, thereby controlling the vapor pressure of the lamp. I have also found that the location of the electrode and metallic shield with respect to the reduced envelope or tube 11 is important, to control vapor pressure, reduce discoloration and condense the mercury. The dimensions and spacing of the elements are important, in producing these results. I have also found that the transverse end portion 21 serves as an anode and the electrode 22 as a cathode and this takes part of the current load from the electrode, increasing the life of the lamp. I have also found that if the wire is connected with the terminal 25 and hence with the source of current, while the wire 14 terminates at the press 23, the result is beneficial inasmuch as the life of the lamp is increased. I have also found that the metallic shield 18 carried by the wire 14 is more effective as a collector when the wire 14 is not connected with the source of current.

It is to be understood that the form of my invention herewith shown and described is to be taken as a preferred example of the same, and that various changes in the shape, size and arrangement of parts may be resorted to, without departing from the spirit of my invention or the scope of the subjoined claims.

Having thus described my invention, I claim:

1. The method of forming an electrode for a fluorescent lamp, comprising first winding a strand of wire into a spiral form, then winding the first spirally wound wire into a spiral form, then winding the second spirally wound wire into a spiral form, then longitudinally stretching the wire after the third spiral winding, applying a plastic electron emission coating to the intermediate portion of the stretched spirally wound wire so that the coating is spaced from the ends of the spirally wound wire when it is stretched and when it is allowed to contract to its normal length, then allowing the stretched spirally wound wire to contract to its normal length.

2. A fluorescent lamp comprising an elongated main light transmitting tube having a coating of fluorescent material, tube extensions carried by the ends of a main tube and having a smaller diameter than the main tube and extending axially of the main tube exteriorly of the main tube, the tube extensions being in communication with the main tube, terminals carried by the outer ends of the tube extensions, an electrode arranged within each tube extension and extending axially thereof, a metallic tubular shield surrounding each electrode in spaced relation and extending axially of the electrode, said tubular shield having spaced longitudinal radially extending flanges, a first wire having its inner end secured to said electrode and extending longitudinally of the tube extension and mounted upon the tube extension and having its outer end electrically connected with the adjacent terminal, a second wire extending longitudinally within the tube extension in spaced substantially parallel relation to the first wire and having its outer end mounted upon the tube extension and free from electrical connection with said adjacent terminal, the second wire having its inner portion extending between said flanges and secured thereto, said inner portion extending forwardly beyond the tubular shield and exteriorly of the same and bent laterally for providing a portion extending radially of the tubular shield, said radial portion being secured to the inner end of the electrode, the radial portion serving as an anode and the electrode serving as a cathode, and an insulating disc arranged within the tube extension outwardly of the tubular shield and mounted upon the first and second wires for rigidly connecting them, the insulating disc serving to trap mercury and controlling the vapor pressure of the mercury.

References Cited in the file of this patent

UNITED STATES PATENTS

| | | |
|---|---|---|
| 2,156,068 | Ruttenauer | Apr. 25, 1939 |
| 2,249,672 | Spanner | July 15, 1941 |
| 2,258,158 | Lowry | Oct. 7, 1941 |
| 2,314,134 | Eknayan | Mar. 16, 1943 |
| 2,363,531 | Johnson | Nov. 28, 1944 |
| 2,491,425 | Stutsman | Dec. 13, 1949 |
| 2,530,394 | Lowry | Nov. 21, 1950 |
| 2,701,849 | Penning | Feb. 8, 1955 |
| 2,761,086 | Noel | Aug. 28, 1956 |
| 2,774,918 | Lemmers | Dec. 18, 1956 |
| 2,857,542 | Curtis | Oct. 21, 1958 |